United States Patent [19]

Faulstich

[11] 4,170,331
[45] Oct. 9, 1979

[54] VEHICLE LADDER RACK

[76] Inventor: Eugene W. Faulstich, 1415 18th Ave. West, Spencer, Iowa 51301

[21] Appl. No.: 919,468

[22] Filed: Jun. 27, 1978

[51] Int. Cl.² .............................................. B60R 9/00
[52] U.S. Cl. ...................................... 224/324; 182/127
[58] Field of Search ............... 254/139.1; 224/42.1 R, 224/42.1 F, 42.1 E, 42.1 H, 29 R; 296/100; 182/127, 82; 248/503; 211/13; 280/179 R

[56] References Cited

U.S. PATENT DOCUMENTS 3,722,766  3/1973  Barrineau et al. ............. 224/42.1 F

FOREIGN PATENT DOCUMENTS 800941  7/1949  Fed. Rep. of Germany ...... 224/42.1 F
1232173  4/1960  France ................................. 224/42.1 R

*Primary Examiner*—Robert J. Spar
*Assistant Examiner*—Kenneth W. Noland
*Attorney, Agent, or Firm*—Zarley, McKee, Thomte, Voorhees and Sease

[57] ABSTRACT

A ladder rack mounted on top of a vehicle includes upstanding guide stops at one end only of the rack on each side frame member for holding one end of a ladder while the other end is being pivoted onto the rack. An upstanding stop on an end cross-frame member engages a rung of the ladder adjacent one end and a coil spring mounted on a cross-frame member at the other end of the rack includes a perpendicular finger end portion adapted to be pivoted from a horizontal position to a vertical position in engagement with an adjacent rung of the ladder to apply pressure downward and towards the stop on the other cross-frame member.

6 Claims, 1 Drawing Figure

VEHICLE LADDER RACK

BACKGROUND OF THE INVENTION

It is common to transport extension ladders on top of vehicles such as vans and pickup trucks. A problem associated with the transporting ladders is the inconvenience of placing the ladders atop of the vehicles and then holding them stationary during travel. One end of the ladder at a time is ordinarily placed on the rack and it is a problem to hold the first end on the rack while the other end is being lifted into place. Once the ladder is atop of the rack it is ordinarily free to move about and produces objectionable rattling noises but more importantly, causes abrasive wear on the ladder and the rack and is dangerous since it may become detached from the rack and fall to the ground. Accordingly, a simplified rack is needed that will facilitate mounting the ladders on top of vehicles and then yieldably hold the ladders still against movement and abrasive wear during transport but yet be easy to remove as desired. The ladder rack of this invention accomplishes these objectives.

SUMMARY OF THE INVENTION

The ladder rack of this invention may be detachably connected to the top of any vehicle by feet mounted at each corner adapted to be connected to the rain gutter or the vehicle body such as a topper unit enclosure on a pickup truck as disclosed in my co-pending application, Ser. No. 743,229, filed Nov. 19, 1976 now U.S. Pat. No. 4,103.956. The mounting of the rack to the vehicle may be accomplished by utilization of the mounting brackets disclosed in my issued U.S. Pat. No. 3,750,845, Aug. 7, 1973, Support Mounting Assembly.

The ladder rack of this invention includes oppositely disposed side-frame members interconnected by oppositely disposed end frame members. One of the end frame members includes a stationary upstanding stop element for engaging a rung of a ladder at one end of the ladder. The cross-frame member at the opposite end of the rack is rotatable and carries a coil spring having a free-end portion with a hook on the oter end with the free-end portion being pivotable from a horizontal position below the ladder to an upstanding position between the rungs of the ladder and for engagement with an adjacent ladder rung such that as the spring is rotated pressure is applied downwardly and towards the other stop member as the free-end portion of the coil spring tends to wrap itself around the cross-frame member thereby shortening its effective length and thereby applying the downward pressure on the ladder rung. A lever is connected to the rotatable cross-frame member and is engagable with a stop on the adjacent side frame member to limit pivotable movement that will permit this engagement of the pivotal stop with the adjacent ladder rung. Accordingly, the ladder is tightly but yieldably held atop of a vehicle and ladder movement during transport has been eliminated.

Positioning of the ladder on top of the vehicle has been facilitated by placement of upstanding guide stops at opposite corners of one end of the rack whereby one end of the ladder may be first placed on top of the rack against one of the stops while the opposite end of the ladder is raised into position on the rack over the pivotal coil-spring stop which, upon operation, locks the ladder yieldably in place on the rack.

DESCRIPTION OF THE PREFERRED EMBODIMENT

Figure 1:
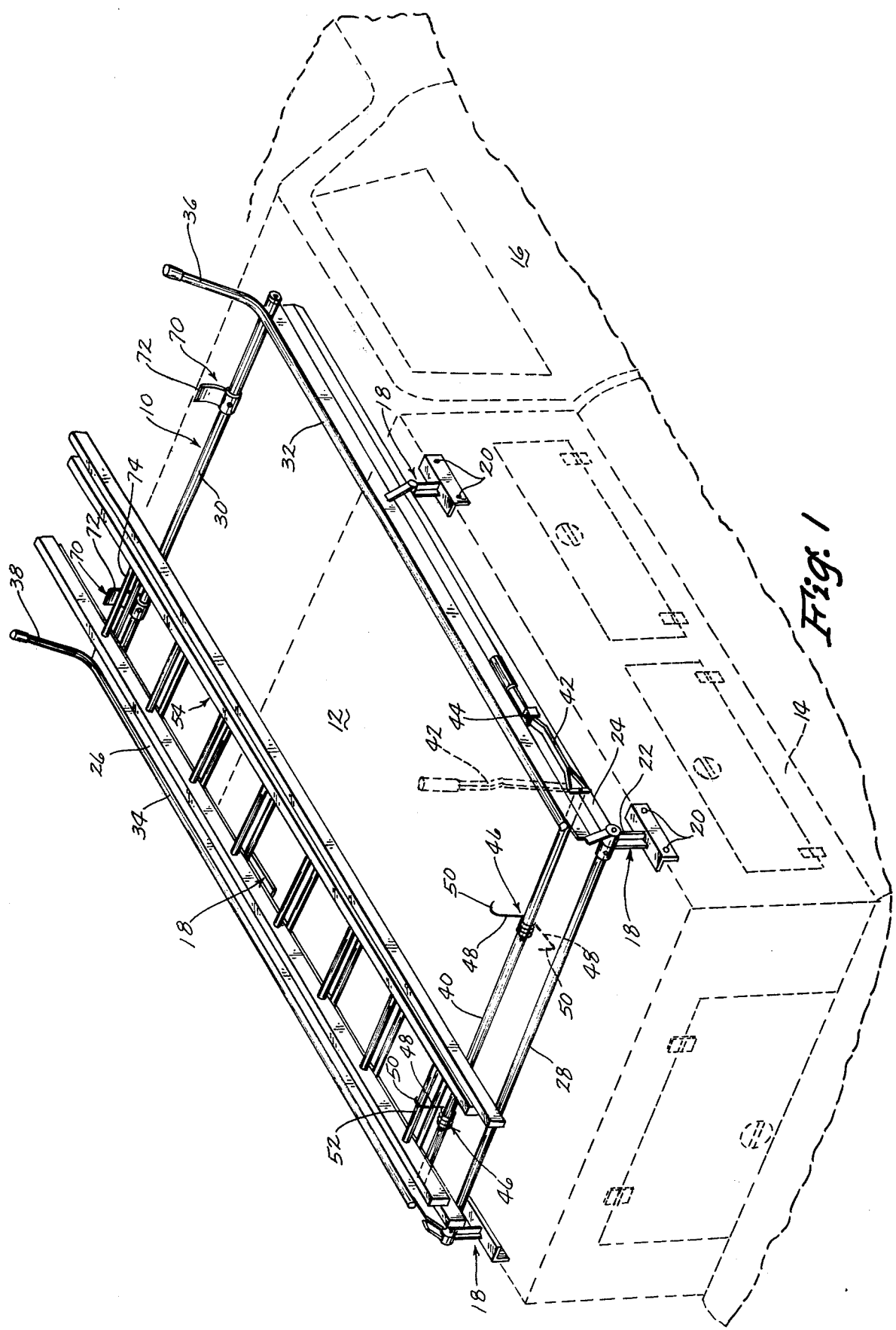
FIGURE 1 of the drawings is a perspective view of the ladder rack mounted on top of a pickup truck having an enclosure on the pickup box.

The ladder rack of this invention is referred to generally by the reference numeral 10 and is shown mounted on an enclosure 12 carried by the box 14 of a pickup truck 16. The rack 10 includes corner mounting brackets 18 fastened by bolts 20 to the side walls of the enclosure 12. The brackets 18 include upstanding posts 22 to which oppositely disposed side-frame members 24 and 26 and oppositely disposed cross-frame members 28 and 30 are connected.

Atop of the side frame members 24 and 26 are side-frame tubes 32 and 34 which increase the height of the side-frame members but also include forwardly disposed upstanding forwardly extending guide stop end portions 36 and 38 which permit holding one end of the ladder first placed onto the rack 10 while the opposite end is being raised into position on the rack.

Adjacent the cross-frame member 28 is an additional cross-frame member 40 rotatably connected between the side frame members 24 and 26 and rotatable by a lever 42 positioned on the outside of side-frame member 24 and adapted to be locked against upward travel by a stop element 44.

A pivotal ladder rung stop 46 is carried on the rotatable cross frame member 40 and includes a coil spring rotatable therewith and including a perpendicular portion 48 having an end portion 50 perpendicular to the portion 48. End portion 50 includes a slight return bend for applying and maintaining downward pressure on the rung 52 of an extension ladder 54.

The forward cross-frame member 30 includes a stationary ladder rung stop 70 having an upper free end 72 curved slightly rearwardly to limit upward travel of the ladder by engagement with the adjacent ladder rung 74 along its top side.

The coil spring 40 is placed on the rotatable cross-frame member 40 such that it may be pivoted from the substantially horizontal dashline position to the substantially vertical solid line position in engagement with the ladder rung 52 as the lever 42 moves from the dashline to solid line position. The lever 42 may be displaced outwardly around the stop 44 or the cross-frame member 40 may move horizontally to move the lever 42 outwardly such that it may be moved around the stop 44 and then back into engagement with the stop where it is held against the stop by the action of the coil spring end portion 48 engaging the rung 52 and applying downward and forward pressure thereto. The downward pressure is the result of the tendency of the coil spring to wind itself onto the cross-frame member 40 thereby effectively shortening the length of the free end portion 48 and thereby drawing the portion 50 downwardly against the top of the rung 52.

As many ladder rung stops 70 and 46 are provided on the rack 10 as there are ladders and as seen in the drawing, two ladders may be accommodated. The stops are further coated with vinyl or rubber material to further limit any abrasive action normally resulting from two metals rubbing against each other.

It is thus seen that one or more ladders may be easily mounted atop of a vehicle having the ladder rack of this invention and held yieldably but firmly in place thereon without any abrasive wear resulting or any rattling occurring but when use of the ladders is desired, they may be easily removed by operation of a single lever 42.

What is claimed is:

1. A ladder rack for mounting atop of a vehicle comprising, a pair of side-frame members interconnected at opposite ends by cross-frame members, an upstanding stop on one of said cross-frame members for engaging a rung of a ladder on one end of the ladder to limit movement of the ladder in one direction, a spring finger extending perpendicular to said other cross frame member and being pivotable between a substantially horizontal position to an upstanding substantially vertical position for engagement with the rung of a ladder at the other end of the ladder thereby yieldably maintaining said ladder in a stationary position on said cross-frame members between said upstanding stop and said spring finger, and lever means operatively connected to said pivotable spring finger for pivoting it between said horizontal and vertical positions, said spring finger being further defined as an end portion of a coil spring mounted on said other cross-frame member and rotatable with said other cross-frame member by said lever means connected thereto and said end portion of said coil spring having a hook means for engaging the top side of said ladder rung at said other end of said ladder when said spring finger is in said vertical position whereby pivoting of said spring finger against the ladder rung at said other end of said ladder applied pressure to said ladder downwardly towards said cross-frame members and horizontally towards said upstanding stop whereby, rotation of said other cross-frame member against the resistance of said ladder rung of said other end of said ladder tends to wrap a coil portion of said coil spring onto said other cross-frame member thereby shortening the effective length of said end portion and thereby drawing the end portion of said spring finger downwardly against the ladder rung at said other end of said ladder.

2. The structure of claim 1 wherein said lever means is positioned on the outside of one of said side-frame members and a locking stop is positioned on said one of said side-frame members in the line of travel of said lever means to limit pivotal movement of said lever, said other cross-frame member and said spring finger when said spring finger is in said vertical position yieldably engaging the rung of a ladder.

3. The structure of claim 2 wherein said lever means is limited against pivoting away from said locking stop by said spring finger engaging the adjacent rung of a ladder.

4. The structure of claim 1 wherein each of said side-frame members include at one end only upstanding guide stop members against which one end of a ladder may be placed and held while moving the other end of the ladder onto the rack atop of a vehicle.

5. The structure of claim 1 wherein said ladder rack includes mounting brackets at each corner for mounting said rack to a vehicle top.

6. The structure of claim 1 comprising a pair of upstanding stops disposed in spaced apart relation on said one cross-frame member and a pair of spring fingers similarly disposed in spaced apart relation on said other cross-frame member whereby a pair of ladders may be mounted on said rack.

* * * * *